Nov. 28, 1967  R. B. RUSSELL, JR., ET AL  3,354,703
SHIPS STRAIN MEASURING SYSTEM
Filed June 27, 1963  5 Sheets-Sheet 3

INVENTORS
ROGER B. RUSSELL, Jr.
MARTIN R. BATES
BY
ATTYS.

Nov. 28, 1967  R. B. RUSSELL, JR., ET AL  3,354,703
SHIPS STRAIN MEASURING SYSTEM
Filed June 27, 1963  5 Sheets-Sheet 4

INVENTORS
ROGER B. RUSSELL, Jr.
MARTIN R. BATES
BY
ATTYS.

INVENTORS
ROGER B. RUSSELL, Jr.
MARTIN R. BATES
BY
ATTYS.

United States Patent Office 3,354,703
Patented Nov. 28, 1967

3,354,703
SHIPS STRAIN MEASURING SYSTEM
Roger B. Russell, Jr., Kenmore, and Martin R. Bates, Buffalo, N.Y., assignors, by mesne assignments, to the United States of America as represented by the Secretary of the Navy
Filed June 27, 1963, Ser. No. 291,212
5 Claims. (Cl. 73—88.5)

This invention relates to monitoring devices, and more particularly relates to monitoring devices for determining the structural strain characteristics of ships at sea.

Ships at sea are subjected to tensile and compressional stresses of various magnitudes and directions. The safety of the structural members of the ship depend upon both the frequency and magnitude of the variations in the stress set up in the members by the actions of the sea.

To some extent, the captain of any vessel attempts to estimate these stresses by sensing the ships motion in his semi-circular canals, the soles of his feet and the pit of his stomach. He may rely upon such estimates to inform him when he should change the speed or course of his ship so as to reduce these stresses and therefore prevent structural damages to his ship. However, these estimates are inaccurate since they depend upon body condit'on and the individual experience of the captain. Accordingly, it is an object of this invention to provide apparatus for monitoring the stress of a ship in a reliable manner.

It is a further object of this invention to provide a device which will measure the strain upon a ship and make a permanent record of this strain so as to provide design information for future ships or for changes in the same ship.

It is a still further object of this invention to provide a device which measures the strain upon a ship and which provides a warning when this strain is so great as to threaten structural damages to the ship.

Other objects and many of the attendant advantages of this invention will be readily appreciated as the same becomes better understood by reference to the following detailed description when considered in connection with the accompanying drawings wherein.

Figure 1:
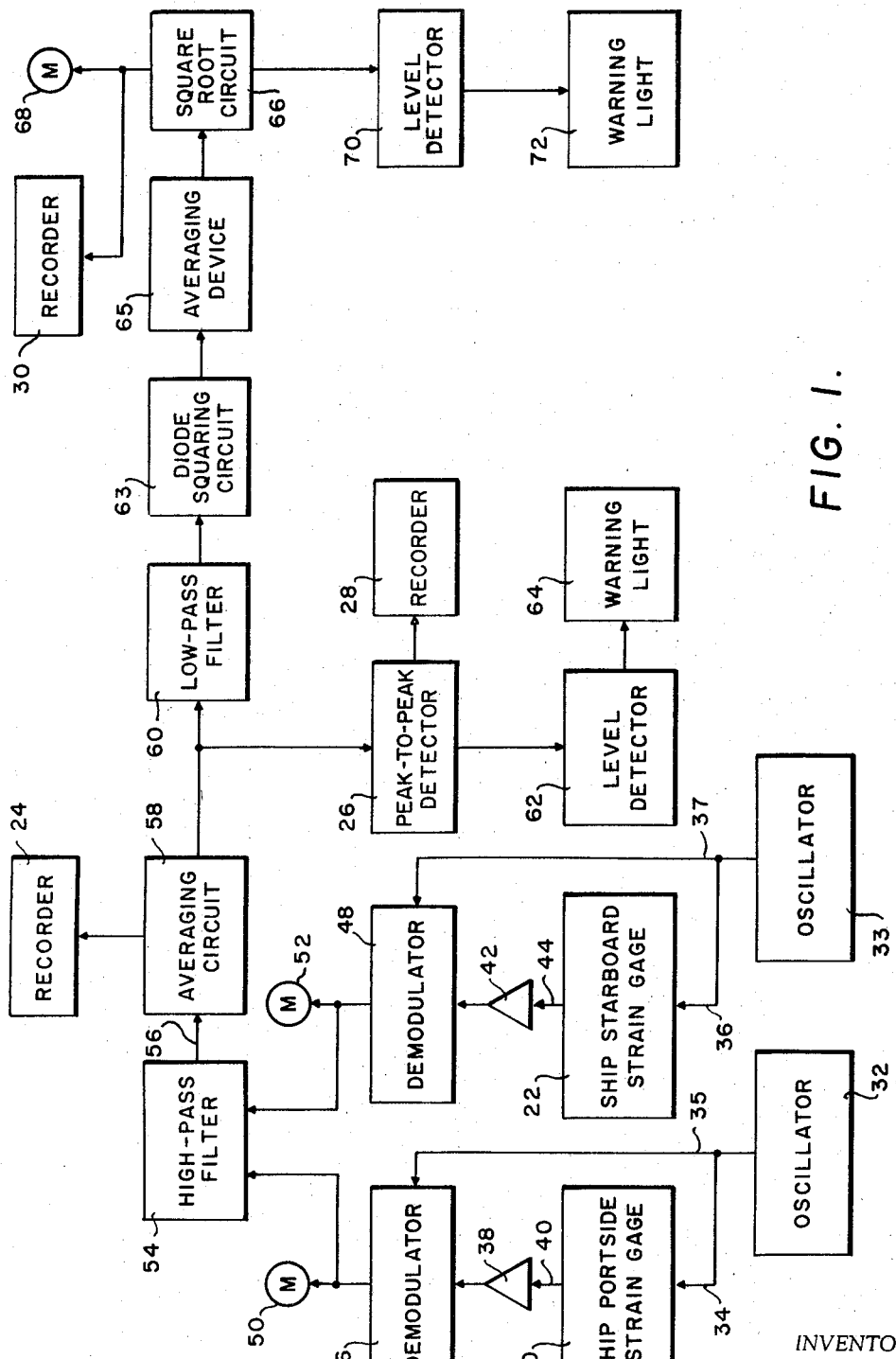
FIG. 1 is a block diagram showing the relationship between the various components in an embodiment of the invention.

Referring specifically to FIG. 1, a block diagram of an illustrative embodiment of the invention is shown in which two strain gages 20 and 22 convert the strain of the structure of a ship to electrical voltages which vary in amplitude in proportion to the strains. These voltages are recorded by recorder 24; the peak to peak values of the voltages are determined by peak extractor 26 and recorded by recorder 28; and the RMS (root mean square) value of the voltages are found and recorded by recorder 30.

The frequency of the stresses, their peak to peak values and their RMS values can be used by the captain of the ship to determine when the stresses are becoming so great as to threaten structural damage to the ship. He may accordingly change the course and the speed of the ship.

The prediction of future damage to a ship from the stresses imposed upon it by the action of the sea is based fundamentally upon recent theoretical work such as that explained by N. H. Jasper in The Statistical Distribution Patterns of Ocean Waves, and of Wave Induced Ship Stresses and Motions, With Engineering Applications. Society of Naval Architects and Marine Engineers, New York, Nov. 15 to 16, 1956.

It has been found that the statistical pattern of ship stress as well as the statistics of wave height can generally be fitted by the Rayleigh distribution. If this distribution is assumed, then the probable maximum of 100 stress cycles is given by 2.17 times the RMS value, measured just before the prediction. This prediction assumes, of course, that the sea state, the course of the ship and the speed of the ship remain constant. Similarly it is anticipated that the maximum stress will be less than 4 times the RMS stress approximately 99.8 percent of the time. This RMS measurement and the corresponding prediction of maximum probable stress may be utilized under heavy motion conditions as an objective criterion and guide for use by the captain in deciding whether his ship is in danger of being subjected to an undesirable stress level.

The two strain gages 20 and 22 are mounted amidships on structural members located on the port and starboard sides of the ship respectively. The resulting information from the main hull girder stress can be utilized to predict the maximum probable stress anticipated during the ensuing 15 minutes of operation, and provides the captain with an objective basis for making speed and course changes when the probable maximum flexing stress becomes excessive. In addtion, the device permits an evaluation of the effects of the captain's decision on the flexing stress statistics.

Oscillator 32 provides 1,000 c.p.s. (cycles per second) power to the strain gage 20 and to the demodulator 46 through conductors 34 and 35 respectively; oscillator 33 provides 1,000 c.p.s. power to the strain gage 22 and to the demodulator 48 through conductor 36 and 37 respectively. This 1,000 c.p.s. power is amplitude modulated by the strain gages in proportion to the strain on the ship.

The modulated 1,000 c.p.s. output from strain gage 20 is connected to amplifier 38, which amplifies it, by conductor 40; the modulated 1,000 c.p.s. output from strain gage 22 is connected to amplifier 42 by conductor 44. Demodulators 46 and 48 are connected to amplifiers 38 and 42 respectively and convert the amplitude modulated A-C (alternating current) to D-C (direct current) voltages which vary in proportion to the strain upon the ship.

Meter 50 is connected to the output of the demodulator 46 and indicates the instantaneous variations in the strain on the port side of the ship; meter 52 is connected to the output of the demodulator 48 and indicates the instantaneous variations in the strain on the starboard side of the ship.

The high-pass filter 54 is electrically connected to both demodulator 46 and demodulator 48 and produces an output on conductor 56 which is connected for long term drift and dead load voltages from the signal. Dead load voltage refers to the measured stresses existing in the vessel caused by the force difference between the ship's deadweight and the buoyant force exerted by the water. Conductor 56 is connected to the averaging circuit 58, which produces an output that is the algebraic sum (proportional to the average) of the signals received from the two after filtering. The signal output from the averaging circuit 58 is recorded by recorder 24 and passed to the peak-to-peak detector 26 and to the low pass filter 60.

The peak-to-peak detector 26 provides an output that is proportional to the peak-to-peak voltage taken from the averaging circuit 58. This output is recorded by recorder 28. It is also conducted to the level detector 62 which determines when it exceeds a predetermined value. When the peak-to-peak voltage exceeds this predetermined amplitude the level detector 62 causes warning light 64, to which it is connected, to glow. The warning light indicates that the peak stresses on the ship are exceeding a safe value.

The output from the averaging circuit 58 is also conducted to low pass filter 60 which removes the whipping stress voltages. Whipping stress voltage is voltage induced by high frequency vibration stress in the hull resulting from impact from waves, machinery, etc. The output from low pass filter 60 is conducted to diode squaring circuit 63 in which it is squared and then conducted to averaging device 65 which produces an output that varies as the mean value of the signal from diode squaring circuit 63. This mean square value of voltage is conducted to square root circuit 66 which produces an output that is the square root of the input and which, therefore, varies as the RMS of the stresses on the ship.

This RMS voltage is recorded by recorder 30 and is indicated on meter 68, each of which is connected to square root circuit 66. This RMS voltage is also conducted to level detector 70. When the RMS voltage exceeds a predetermined value of amplitude, the level detector causes warning light 72 to glow which indicates the stresses on the ship are dangerously high.

The illustrative embodiment of this invention provides a permanent record of the stress waveform, the peak-to-peak values of stress and the RMS values of stress for future use. Meter readings of the stress waveform and of the RMS values of stress are also provided. In addition to this warning lights indicate when the peak-to-peak values of stress of the RMS values of stress have become so large as to threaten structural damage to the ship. This information can be used to predict future damage or to determine if the course and speed of the ship should be changed.

Figure 2:
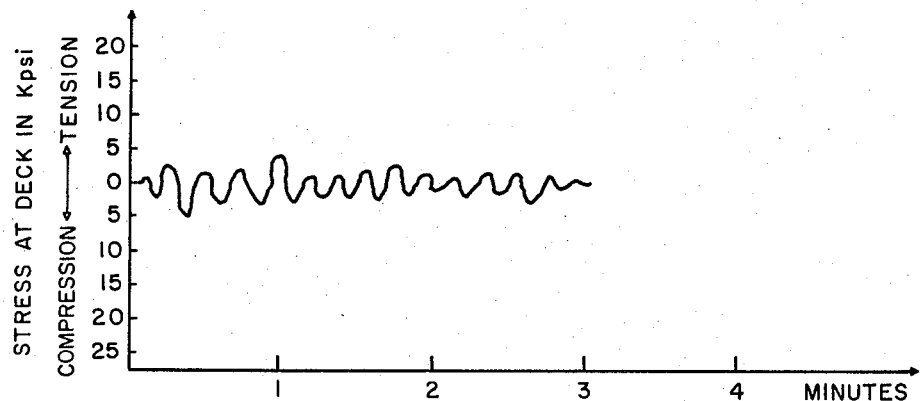
FIG. 2 is a graph of a typical waveform of the instantaneous stress of the ship as indicated by the invention after thermal drift and dead load voltages have been removed.
Figure 3:
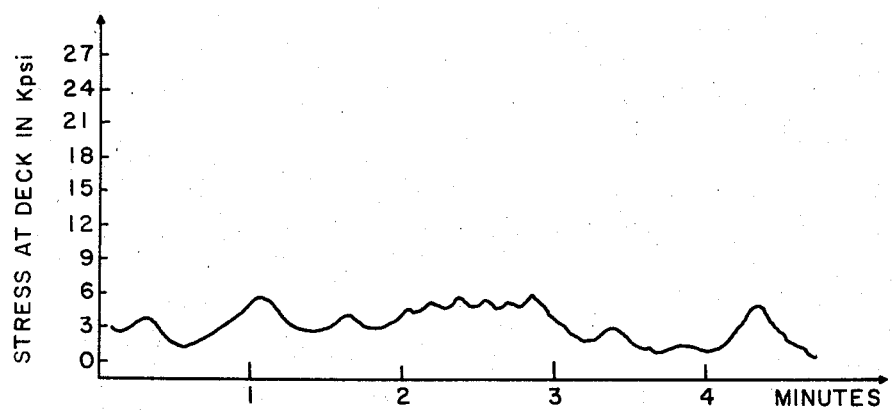
FIG. 3 is a graph of a typical waveform of the peak to peak values of the stress on the ship as indicated by the invention.
Figure 4:
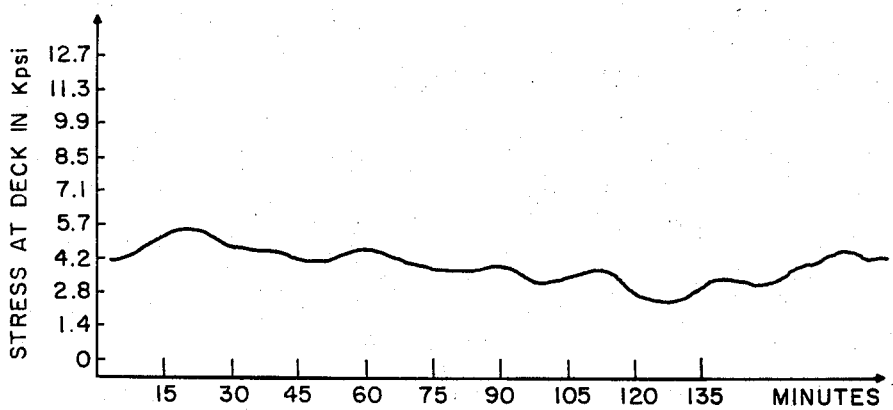
FIG. 4 is a graph of a typical waveform of the RMS value of the stress on a ship as indicated by the invention after thermal drift, dead load and whipping stress voltages have been removed.

The type of graphs that are obtained from this embodiment of the invention are illustrated in FIG. 2, FIG. 3, and FIG. 4. The curves illustrated in these figures are similar to those obtained on a 380 foot destroyer which was proceeding in head (000-degree relative heading) and quartering (060-degree relative heading) seas at speeds from 3 to 17.5 knots. The waves were visually observed to have significant wave heights of about 17 feet peak-to-peak. FIG. 2 is a graph of the instantaneous stress of the ship as indicated by the embodiment of the invention after thermal drift and dead load voltages were removed; FIG. 3 is a graph of the peak-to-peak values of stress of the ship; and, FIG. 4 is a graph of the RMS value of the stress on the ship. The ordinates in each of the figures represent the stress of the ship as measured on its deck in k.p.s.i. (kilopounds per square inch), and the abscissas represent time.

The oscillators 32 and 33, which supply the 1,000 c.p.s. electric power for the strain gages 20 and 22, can be Hartley oscillators. The strain gages 20 and 22 are of the bridge type such as the one disclosed in U.S. Patent No. 3,034,-346. The active gage may be mounted as described in U.S. Patent No. 2,378,422. The gain of the strain gage amplifiers 38 and 42 is adjusted to yield an output of 1 volt D-C per 33 micro-inches/inch of the active gage. When the active gage is mounted on structural steel whose modulus of elasticity is typically $30 \times 10^6$ p.s.i. (pounds per square inch), the gain of the strain gage amplifiers is 1 volt per 1,000 p.s.i. stress. Thus all the indicators are calibrated in p.s.i. of stress.

The A-C amplifiers 38 and 42 of the demodulators 46 and 48 are used to transform the bridge output to direct current to permit high-pass filtering and to allow transmission of reasonably high-level D-C signals from the amidships location of the strain gages to the remotely located computer-recorder console. The port and starboard demoulated signals are transmitted over a twisted, shielded pair of wires to the console where they are combined and applied as an input to the high-pass filter.

Figure 5:
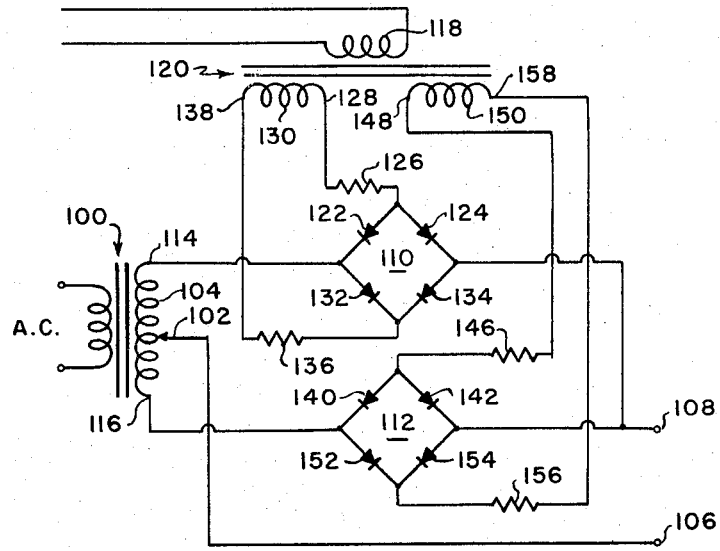
FIG. 5 is a schematic circuit diagram of a demodulating network used in an embodiment of the invention.

A schematic circuit diagram of one of the two identical demodulators 46 and 48 is shown in FIG. 5. The signal, which represents stress, is applied to the primary coil of the output transformer 100 by the strain gage amplifiers. A center tap 102 on the secondary 104 of the output transformer 100 is electrically connected to the output terminal 106. The other output terminal 108 is connected to each of the rectifier bridges 110 and 112. One end 114 of the primary winding 104 is connected to rectifier bridge 110 and the other end 116 of the primary winding 104 is connected to rectifier bridge 112.

The 1,000 c.p.s. voltage from one of the oscillators 32 or 33 is applied to the primary winding 118 of the reference transformer 120. The anodes of diodes 122 and 124, which form part of the rectifier bridge 110, are each connected to one end of the 10K (10 kilo-ohm) resistor 126. The other end of the resistor 126 is connected to one end 128 of a first-secondary winding 130 of the reference transformer 120. The cathodes of diodes 132 and 134, which form the remainder of the rectifier bridge 110, are each connected to one end of the 10K resistor 136. The other end of resistor 136 is connected to the other end 138 of the first-secondary winding 130. The anode of diode 132 is connected to the cathode of diode 122 and to the end 114 of the output transformer 100; the anode of diode 134 is connected to the cathode of diode 124 and to output terminal 108.

The anodes of diodes 140 and 142, which form part of the rectifier bridge 112, are each connected to one end of the 10K resistor 146. The other end of the resistor 146 is connected to one end 148 of a second-secondary winding 150 of the reference transformer 120. The cathodes of diodes 152 and 154, which form the remainder of the rectifier bridge 112, are each connected to one end of 10K resistor 156. The other end of the resistor 156 is connected to the other end 158 of the second-secondary winding 150. The anode of diode 152 is connected to the cathode of diode 140 and to the end 116 of the secondary winding 104 of the output transformer 100; the anode of diode 154 is connected to the cathode of diode 142 and to the output terminal 108. Each of the diodes in this demodulator circuit may be of the type 1N629.

The rectifier bridges 110 and 112 each provide full-wave rectification of the 1,000 c.p.s. reference voltage. The amplified signal from the strain gages is applied to the output transformer 100 in the form of an amplitude modulated 1,000 c.p.s. carrier. The center tap 102 of this transformer provides the ground connection to output terminal 106. The output of the full-wave rectifier 110 is connected across one end 114 of the output transformer 100 and the output terminal 108; the output of the full-wave rectifier 112 is connected across the other end 116 of the output transformer 100 and the output terminal 108. Together they remove the 1,000 c.p.s. from the amplitude modulated signal that is applied to the output transformer 100.

Figure 6:
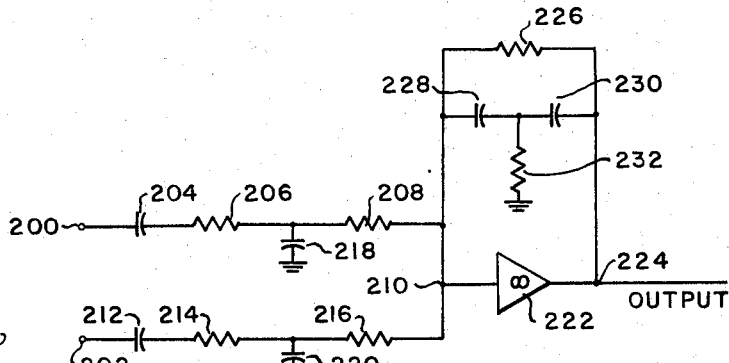
FIG. 6 is a schematic circuit diagram of the averaging network used to find the average of the strain gage voltages and of the high pass filter used in an embodiment of the invention.

The D-C signal which appears at the output terminals 106 and 108 of the demodulators 46 and 48, is applied to the high-pass filter 54 and the averaging circuit 58. The high-pass filter and averaging circuit are shown as a schematic circuit diagram in FIG. 6. They have a time constant of 110 seconds with a 3-decibel attenuation at approximately 0.009 radian/second (0.00145 c.p.s.). These circuits eliminate or minimize the thermal drift in the equipment and the steady-state stresses induced by the shifted or changed ship loads.

The demodulated signal that originated with the starboard strain gage 22 is applied to terminal 200 of the high-pass filter and the demodulated signal that originated with the port strain gage 20 is applied to terminal 202 of the high-pass filter. Terminal 200 is connected in series with the capacitor or parallel group of capacitors 204 having a value of 25 mfd. (microfarads), 2M (mega-ohm) resistor 206, 2M resistor 208 and terminal 210 respectively; terminal 202 is connected in series with the capacitor or parallel group of capacitors 212 having a value of 25 mfd., 2M resistor 214, 2M resistor 216 and terminal 210. The 0.002 mfd. capacitor 218 has one plate connected between the resistors 206 and 208 and the other plate connected to ground; the 0.002 mfd. capacitor 220 has one plate connected between resistors 214 and 216 and the other plate connected to ground. The capacitors 218 and 220 shunt 60 c.p.s. signals to ground. The series combination of 2M resistors and 25 mfd. capacitors provide the correction for thermal drift in the equipment and the steady-state stresses.

The filter between terminal 200 and terminal 210 for the starboard input and the filter between terminal 202 and terminal 210 for the port input form two input circuits for the operational amplifier 222 which has its input connected to the terminal 210. Feedback from the output terminal 224 to the input terminal 210 of the high-gain operational amplifier 222 is provided by a 800K resistor connected between terminal 224 and terminal 210, and two 0.027 microfarad capacitors 230 and 228 connected in series between the same terminals 224 and 210 respectively. A 400K resistor has one end connected between the capacitors 228 and 230 and the other end grounded. A voltage proportional to the algebraic sum of the input voltages is provided at terminal 224 by the operational amplifier.

Figure 7:
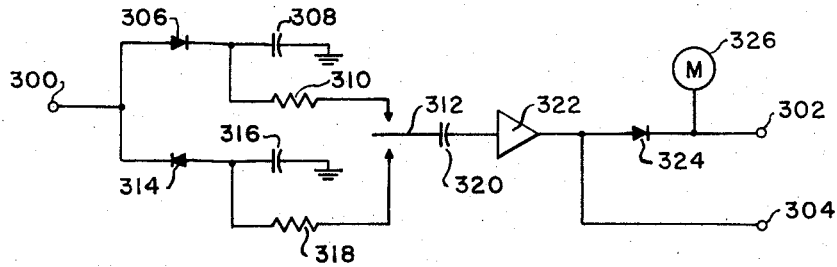
FIG. 7 is a schematic circuit diagram of the peak-to peak detector circuit used in an embodiment of the invention.

The output from the operational amplifier is applied to the input of the peak-to-peak detector 26. A schematic circuit diagram of the peak-to-peak detector is shown in FIG. 7 having an input terminal 300 for receiving the output from the averaging circuit, an output terminal 302 for providing a signal that is indicative of the peak-to-peak voltage to the recorder 28, and an output terminal 304 for providing a signal that is indicative of the peak-to-peak voltage to the level detector 62.

The input terminal 300 is connected to the anode of 1N277 diode 306. The cathode of diode 306 is connected to one plate of capacitor 308 and to one end of resistor 310; the other plate of capacitor 308 is grounded and the other end of resistor 310 is connected to one contact of chopper 312. The input terminal 300 is also connected to the cathode of 1N277 diode 314. The anode of diode 314 is connected to one plate of capacitor 316 and to one end of resistor 318; the other plate of capacitor 316 is grounded and the other end of resistor 318 is connected to the other contact of chopper 312.

Diode 306, capacitor 308, and resistor 310 comprise a positive peak detector; diode 314, capacitor 316, and resistor 318 comprise a negative peak detector. The chopper 312 samples the positive and negative peaks and provides an output to one plate of capacitor 320 that is proportional to the peak-to-peak voltage. The other plate of capacitor 320 is connected to the input of amplifier 322. The output of the amplifier 322 is passed through diode 324 to meter 326 and output terminal 302. It is also passed by a parallel path to output terminal 304.

Figure 8:
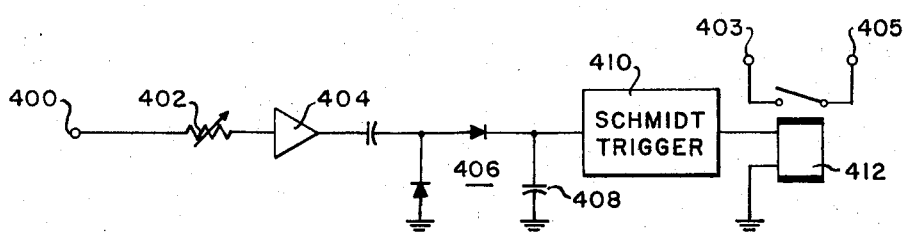
FIG. 8 is a schematic circuit diagram of the level detector used in an embodiment of the invention.

The signal from terminal 302 is recorded and the signal from terminal 304 is passed to the level detector 62 to determine if the stress is of a dangerous level. A schematic circuit diagram of the level detector is shown in FIG. 8 having input terminal 400 and output terminals 403 and 405 which are connected to a warning light circuit.

The level detector 62 is comprised of the series connection of the terminal 400, potentiometer 402, rectifier 406, filter 408, Schmitt trigger 410 and relay 412. The potentiometer 402 may be adjusted so that when a critical voltage is reached on input terminal 400 the Schmitt trigger will switch and cause the relay 412 to close the warning light circuit.

Figure 9:
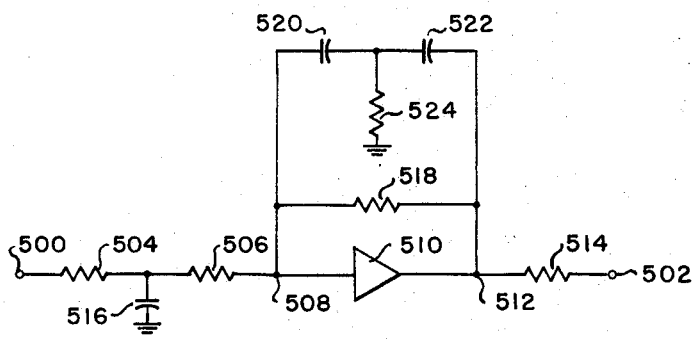
FIG. 9 is a schematic circuit diagram of the low pass filter used in an embodiment of the invention.

The output from the averaging circuit 58 is also connected to the low-pass filter 60. A schematic circuit diagram of the low-pass filter 60 is shown in FIG. 9, having input terminal 500 and output terminal 502. Input terminal 500, 121K resistor 504, 121K resistor 506, terminal 508, operational amplifier 510, terminal 512, 100K resistor 514, and output terminal 502 are electrically connected in series in the order named. An 11.2 microfarad capacitor 516 has one plate connected between resistors 504 and 506 and the other plate grounded. Between terminals 508 and 512, a 242K resistor 518 and a series combination of two 3.9 microfarad capacitors 520 and 522, are connected to provide two parallel feedback paths for the operational amplifier 510. An 85.6K resistor has one end connected between the capacitors 520 and 522 and the other end grounded.

The low-pass filter 60 removes the high-frequency components of stress variations caused by slamming or other vibratory forces from the D-C signal. The filter is 0.6 critically damped at a cutoff frequency of 0.242 c.p.s. and has a 2- to 3-percent over shoot between 0.1 and 0.2 c.p.s., about 8 percent down at 0.25 c.p.s., and at least 93 percent down at 1 c.p.s.

Figure 10:
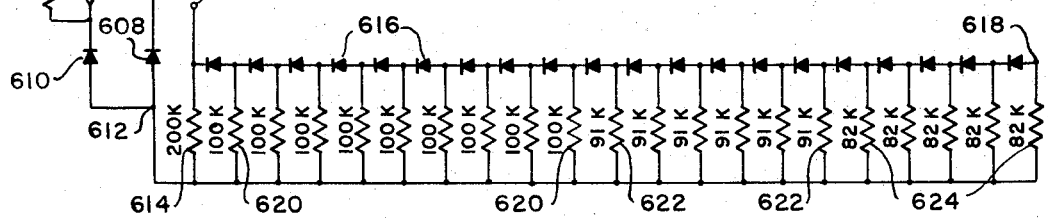
FIG. 10 is a schematic circuit diagram of the diode squaring circuit used in an embodiment of the invention.

The D-C signal from the low-pass filter 60 is passed to the diode squaring circuit 62. A schematic circuit diagram of the diode squaring circuit is shown in FIG. 10, having input terminal 600, input terminal 602 and output terminal 604. The D-C signal from the low-pass filter 60 is applied to both inputs. The signal is inverted by inverting amplifier 606 after being applied to terminal 602. The cathode of a 1N277 diode 608 is connected to terminal 600; the cathode of another 1N277 diode 610 is connected to the output of the inverting amplifier 606. The anode of each of these diodes is connected to terminal 612.

One end of 200K resistor 614 is connected to the terminal 612 and its other end is connected to the output terminal 604. Twenty 1N461 diodes 616 are connected in series between the output terminal 604 and terminal 618 with their cathodes electrically closer to the output terminal 604. Each of the anodes of the first 9 of the iodes 616 from the output terminal 604 have one end of 9 100K resistors 620 connected to it. The other end of each of the resistors 620 is connected to terminal 612. Each of the anodes of the next 6 of the diodes 616 from the output terminal 604 have one end of one of 6 91K resistors 622 connected to it. The other end of each of the resistors 622 is connected to terminal 612. Each of the anodes of the next 5 of the diodes 616 from the output terminal 604 have one end of one of 5 82K resistors 624 connected to it. The other end of each of the resistors 622 is connected to terminal 612.

The output of the diode squaring circuit 63 provides a voltage, which is proportional to the stress squared, to the averaging device 65. An electronic low-pass filter with a seven and a half minute time constant such as the filter shown in FIG. 11 may be used for this averaging device or a servo-tachometer averaging device such as that shown in FIG. 12 may be used.

Figure 11:
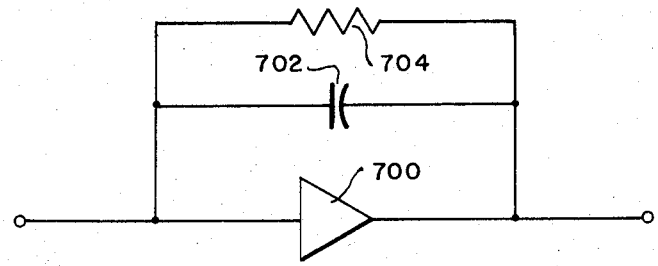
FIG. 11 is an electronic low-pass filter used as an averaging device in an embodiment of the invention.
Figure 12:
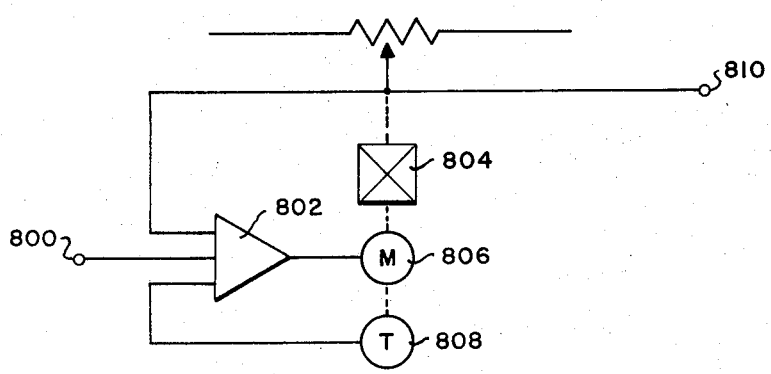
FIG. 12 is a schematic circuit diagram of the servo-tachometer averaging device showing the moving parts diagrammatically.

The low-pass filter of FIG. 11 is essentially an operational amplifier 700 having a feedback network with a 150 microfarad capacitor 702 and a 1M resistor 704 in parallel across the amplifier. The servo-tachometer is shown schematically in FIG. 12 as having input terminal 800, servo-amplifier 802, servo-motor 806, multiplier 804, tachometer 808, and output terminal 810. It has a time constant of 15 minutes.

Figure 13:
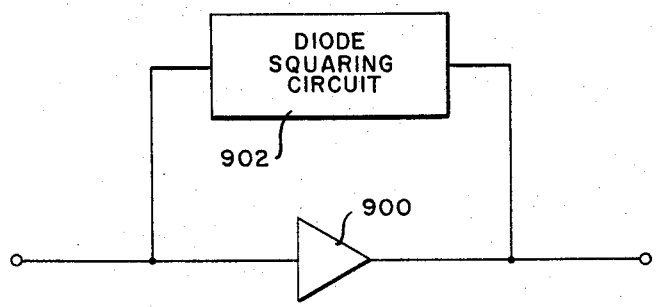
FIG. 13 is a schematic circuit diagram of the square root circuit used in an embodiment of the invention.

A voltage proportional to the square stress, integrated over a period of time is supplied to the square root circuit 66 by the averaging device 65. The square root circuit is shown schematically in FIG. 13. It is comprised of an operational amplifier 900 having a diode squaring circuit 902, such as that shown in FIG. 10, for its feedback loop.

The output from the square root circuit is a voltage that is proportional to the RMS value of the stress on the ship. It is recorded and metered. It is also passed to a level detector 70 which is similar to the level detector 62 shown schematically in FIG. 8. This level detector activates a warning light when the stress reaches a dangerous level.

This stress monitor is compact and inexpensive. It measures the strains on the ship and computes, records, and displays the associated stresses experienced by the ship. The data are displayed by monitor lights, and by meters to aid the captain in ship handling, and the continuous records are suitable for statistical analysis at a later date to provide general information of use in ship design.

Obviously many modifications and variations of the present invention are possible in the light of the above teachings. It is therefore to be understood that within the scope of the appended claims the invention may be practiced otherwise than as specifically described.

What is claimed is:

1. A device for determining the flexing stress of a structure at sea, comprising:
   a source of AC voltage;
   strain gage means, in contact with said structure and electrically connected to said source of AC voltage, for modulating said AC voltage directly in proportion to the stressing of said structure;
   amplifier means, electrically connected to said strain gage means, for amplifying said modulated AC voltage;
   demodulating means, electrically connected to said amplifying means, for converting said modulated AC voltage to a DC voltage which is a proportional and continuously valued representation of said stressing of said structure;
   first display means, electrically connected to said demodulating means, for indicating the magnitude of said DC voltage;
   squaring means, electrically connected to said demodulating means, for squaring said DC voltage;
   averaging means, electrically connected to said squaring means, for providing a voltage output that is the mean value of said squared DC voltage;
   square root determining means, electrically connected to said averaging means, for providing a voltage output that is the RMS of said DC voltage; and
   second display means, electrically connected to said square root determinnig means, for indicating the magnitude of said RMS voltage.

2. A device for determining the flexing stress of a structure at sea as defined in claim 1, in which said squaring means comprises a multi-diode squaring network.

3. A device for determining the flexing stress of a structure at sea as defined in claim 2, in which said averaging means comprises a low pass filter averaging means.

4. A device for determining the flexing stress of a structure at sea as defined in claim 3, in which said first and second display means include warning lights for indicating when the magnitude of said DC voltage and the magnitude of said RMS voltage exceed predetermined values.

5. A device for determining the flexing stress of a structure at sea, comprising:
   a source of AC voltage;
   strain gage means, in contact with said structure and electrically connected to said source of AC voltage, for modulating said AC voltage in proportion to the stressing of said structure;
   amplifier means, electrically connected to said strain gage means, for amplifying said modulated AC voltage;
   demodulating means, electrically connected to said amplifying means, for converting said modulated AC voltage to a DC voltage which is representative of said stressing of said structure;
   meter means, electrically connected ot said demodulating means, for indicating the value of said DC voltage which is a proportional and continuously valued representation of said stressing of said structure;
   first filter means, electrically connected to said demodulating means, for removing thermal drift and dead load voltage;
   first recorder means, electrically connected to said first filter means, for recording said DC voltage with thermal drift and dead load removed;
   measuring means, electrically connected to said first filter means, for determining the peak-to-peak value of said DC voltages;
   second recorder means, electrically connected to said measuring means, for recording said peak-to-peak value of said DC voltage;
   second filter means, electrically connected to said first filter means, for removing whipping stress voltages from said peak-to-peak voltages;
   squaring means, electrically connected to said second filter means, for squaring said peak-to-peak values of voltage with said whipping stress voltages removed;
   averaging means, electrically connected to said squaring means, for providing a voltage output that is the mean value of said squared DC voltage;
   square root determining means, electrically connected to said averaging means, for providing a voltage output that is the RMS of said DC voltage;
   third recorder means, electrically connected to said square root determining means, for recording said RMS of said DC voltage; and
   second meter means, electrically connected to said square root determining means, for indicating the magnitude of said RMS value.

References Cited

UNITED STATES PATENTS

| | | | |
|---|---|---|---|
| 3,034,057 | 5/1962 | Ferguson | 324—132 |
| 2,924,926 | 2/1960 | Gieseler | 73—88.5 |

(Other references on following page)

UNITED STATES PATENTS 2,871,447 1/1959 Hall _____ 324—132 X
2,774,535 12/1956 Anderson.

OTHER REFERENCES

Richman, Peter: "Peak AC to DC Comparator," in Instruments and Control Systems, March 1963, p. 103.

Jasper, Norman H.: "A Statistical Approach to the Measurement and Analysis of Experimental Data," Journal of the American Society of Naval Engineers, 1951, pp. 583–592, vol. 63.

Jasper, Norman H.: "Statistical Distribution Patterns of Ocean Waves and of Wave-Induced Ship Stresses and Motions With Engineering Applications," The Society of Naval Architects and Marine Engineers Transactions, vol. 64, 1956, pp. 375–432.

RICHARD C. QUEISSER, *Primary Examiner.*

J. J. SMITH, CHARLES A. RUEHL,
*Assistant Examiners.*